Feb. 22, 1949.    P. HALPERT ET AL    2,462,095
RATE CIRCUITS
Original Filed Aug. 19, 1941    2 Sheets-Sheet 1
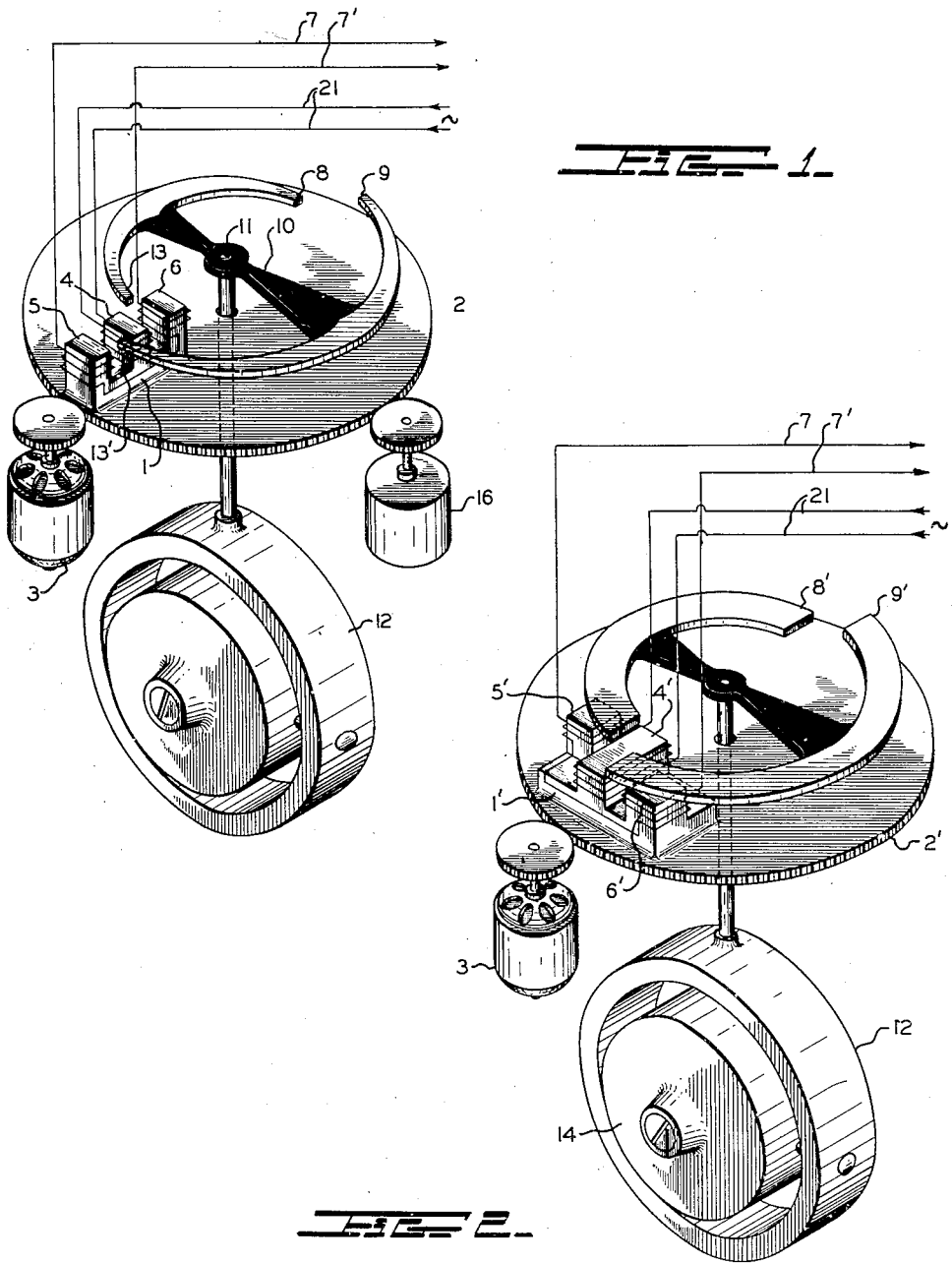
INVENTORS,
P. HALPERT, C. A. FRISCHE,
J. L. BIRD, and O. E. ESVAL;
BY
Herbert H. Thompson
THEIR ATTORNEY.

Feb. 22, 1949. P. HALPERT ET AL 2,462,095
RATE CIRCUITS
Original Filed Aug. 19, 1941 2 Sheets-Sheet 2
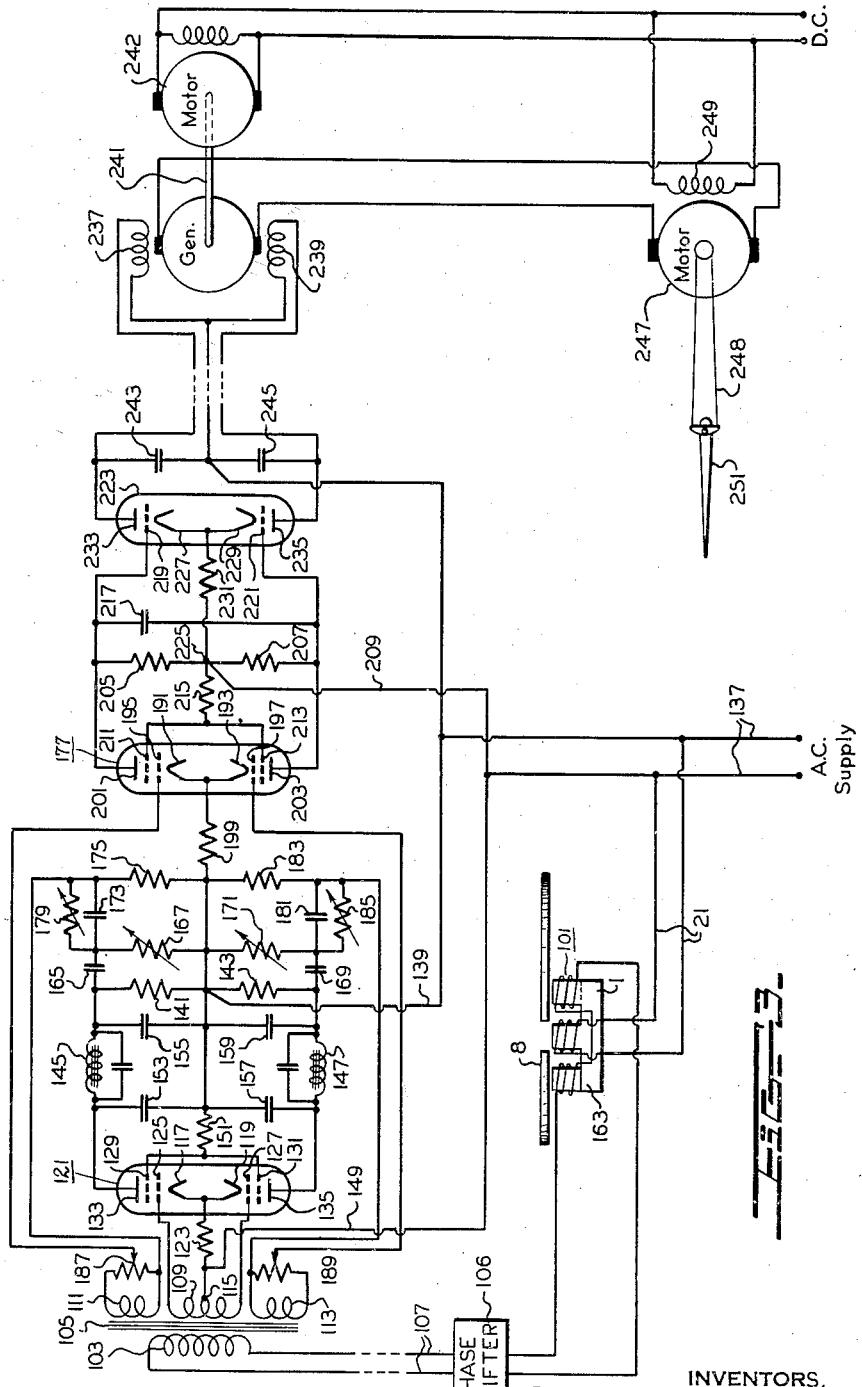
INVENTORS,
P. HALPERT, C. A. FRISCHE,
J. L. BIRD, and O. E. ESVAL;
BY
Herbert A. Thompson
THEIR ATTORNEY.

Patented Feb. 22, 1949

2,462,095

UNITED STATES PATENT OFFICE 2,462,095

RATE CIRCUITS

Percy Halpert, Kew Gardens, and Carl A. Frische and John L. Bird, Lake Success, and Orland E. Esval, Huntington, N. Y., assignors to The Sperry Corporation, a corporation of Delaware Original application August 19, 1941, Serial No. 407,460. Divided and this application June 27, 1942, Serial No. 448,794

6 Claims. (Cl. 178—44)

This application is a division of copending application Serial No. 407,460, for Electrical control systems, filed August 19, 1941, now abandoned.

This invention relates to positional control systems, for remotely controlling and accurately positioning objects such as searchlights and guns, from an accurately positioned or position-maintaining instrument. By our invention we may also control the steering of a dirigible vehicle, such as ship or airplane, by positioning the rudder or other control surface. Our invention also has application to straight follow-up systems wherein the position of a follow-up element is accurately maintained with reference to a rotatable control or sensitive element such as a gyro compass or directional gyro.

For this purpose, we provide a novel pick-off device, such as that shown in Serial No. 448,040, now U. S. Patent 2,415,819, for producing an electrical signal in response to displacement of the control or sensitive element which reverses phase upon reversal of the displacement. In former pick-off devices of this type, for example that shown in Patent No. 1,959,804, to Wittkuhns et al., issued May 22, 1934, for Non-contacting follow-up system, a useful signal is secured only through a comparatively small angle of deflection of the control element, say 10 degrees or less. We overcome this limitation of the prior art and provide a pick-off means in which a positive signal is generated for angular deviations approaching 90 degrees. In addition, we may provide a pick-off device in which the signal output continuously increases as the deviation increases, rather than one which quickly reaches a maximum constant signal, as is the case in the above-mentioned patent.

It has been recognized that the generation of a simple reversible signal is not sufficient for control purposes even where such signal is proportional to the relative displacement between the position-maintaining device and the controlled device. For obtaining accurate control, we propose to generate an electrical signal which not only varies in phase and magnitude with the direction and amount of relative displacement between the control and controlled device but which also varies with the relative velocity and preferably also a higher time derivative of the relative displacement. This is done by operating electrically in our improved rate amplifier upon the signal obtained from our improved pick-off means so as to add to this signal certain components representing the velocity and acceleration of the displacement of the controlling object. With this improved system, it is possible to maintain the relative displacement between two objects at practically zero, or to control the position of a remote object with very high accuracy.

It is the primary object of this invention to provide a rate circuit of the above character in which the components of the rate-taking circuit are so correlated, arranged and of such adjustable character that the values of the derivative signals may be relatively adjusted. It is another object to provide a rate circuit of the foregoing character in which the magnitudes of the time derivative signals may be controlled as to their maximum values and also controlled as to their relative values. It is a still further object to provide a rate circuit of the foregoing character wherein the magnitudes of the two time-derivative signals may be simultaneously adjusted to some limiting value while the relative values thereof, as so limited, may be simultaneously adjusted.

Specifically, we employ a Ward Leonard type of control using a motor-generator set, the generator having two opposed field windings. The A.-C. reversible phase control signal obtained from our improved pick-off means is amplified and modified by the addition of velocity and acceleration components in our improved rate amplifier, whose output includes two direct currents which excite the opposed generator field windings to produce one or the other direction of control of the controlled object, in accordance with the phase of the pick-off signal. The controlled object may be a follow-up motor or a servo motor.

Included in our improved amplifier are means for permitting direct coupling of D.-C. amplifier stages which are A.-C. energized. This may be done by balancing out the fixed bias produced in the output of one stage to prevent its affecting the input of the next stage, and simultaneously providing a signal hold-over means, from one half-cycle of applied energy to the next half-cycle, whereby successive stages may operate successfully despite opposite phase of energization.

Referring to the drawings,

Fig. 1 is a perspective view of the pick-off or signal generating portion for a positional control device, such as used with a directional gyro or a gyro compass.

Fig. 2 is a similar view of a slightly modified form of signal generator.

Fig. 3 is a wiring diagram showing a modified

Ward Leonard servo system, and the rate amplifier therefor, controlled from the signal generator of Fig. 1 or Fig. 2.

The pick-off means or signal generator is shown in Fig. 1 as a variable inductive device comprising a three-legged transformer 1 mounted on a gear follow-up platform 2 which may be rotated from the follow-up motor 3. The center leg 4 of the transformer is shown as continuously excited from a single phase A. C. source 21 while the two outer legs 5 and 6 are connected in opposition so that their output through lines 7—7' is zero when the transformer is balanced, but is of one phase as the induced current in one leg predominates and of the other phase as the induced current predominates in the other leg. Cooperating with said transformer is shown a pair of soft iron armatures 8 and 9 which may be of nearly semi-circular form, each mounted on a common non-magnetic base 10 secured to vertical stem 11 rising from the vertical ring 12 of a gyroscope 14 through an aperture in platform or gear 2 and the hub 15 of the support for transformer 1, so that said armatures are fixedly oriented in azimuth from the gyroscope 14. The armature 8 is shown as of less diameter than armature 9 so that it passes between and above poles 4 and 6 while the armature 9 passes between and above poles 4 and 5. In the normal balanced condition, the two ends 13 and 13' of the armatures lie about on a line with the two outer edges of the poles 4, 5, and 6, in which position there is no net output from the signal generator through lines 7—7', since the voltages induced in legs 5 and 6 then balance one another. Preferably each pole piece is tapered, gradually increasing in cross-sectional area as it recedes from the tips 13 and 13'. By this means, a signal which increases with angular displacement is secured through a fairly large displacement angle, as opposed to the prior art as indicated by the above cited patent. This form of inductive pick-off also has the advantage that control is not lost except when the angular displacement approaches 90° either side of the balanced position, thus maintaining full control over 180 degrees of arc.

The output from this pick-off device, which is the voltage appearing across terminals 7—7', may be amplified in the rate amplifier shown in Fig. 3, which, as will be later described, introduces velocity and acceleration components into the control signal, which then may control motor 3 to drive follow-up platform 2 and transformer 1 into correspondence with armatures 8, 9, the system then acting as a follow-up system. The position of platform 2, which is thereby kept synchronized with that of base 10 and hence with gyroscope 14, may be transmitted to a remote point as by Selsyn transmitter 16, to give a suitable remote indication.

Alternatively, the output of the rate amplifier may control any suitable remote motor, such as 247 (Fig. 3) to remotely control any suitable object, such as a rudder 251. The system may thereby act as an automatic pilot, turning a craft until the orientation of platform 2, which would then be fixed to the craft, corresponds with that of gyroscope 14. The craft then acts as the follow-up element of the system.

It will be obvious that the mountings of transformer 1 and armatures 8, 9 may be interchanged; that is, the transformer may be mounted on the gyro vertical ring 12, and the armatures on the platform 2.

Also, armatures 8, 9, instead of tapering from both ends to the center, might taper continuously from one end to the other. This would give full 360 degrees of control with continuously increasing signal.

In the form of invention shown in Fig. 2 the inductive transformer 1' is similar to that of Fig. 1 except that the three poles in this instance are arranged circumferentially instead of radially as in Fig. 1. In this case, the center pole 4' is of greater width than the outer poles 5' and 6' and the gyro stabilized armatures 8' and 9' are shown as of uniform width. With this construction, armature 8' effectively cooperates only with poles 4' and 5', while armature 9' cooperates only with poles 4' and 6'.

With this type of pick-off, a sharp increase in signal output is obtained for small displacements of armatures 8', 9' relative to transformer 1', but the signal does not vary with displacement over a wide angle, as is the case with the device of Fig. 1. However, full control is maintained over the entire 360 degrees of rotation.

Referring now to Fig. 3, the signal output from the pick-off unit 1 is fed to primary winding 103 of input transformer 105 by wires 107. Transformer 105 has a center tapped secondary winding 109 and two other similar secondary windings 111 and 113. Center tap 115 of winding 109 is connected to the cathodes 117, 119 of duplex tube 121 by way of cathode bias resistor 123 whose resistance value is selected so as to permit both sections of tube 121 to operate at the center of linear portions of their characteristic curves. Tube 121 is indicated as being a twin-tetrode having a pair of control grids 125, 127, a pair of additional grids 129, 131 and a pair of anodes 133, 135.

Control grids 125, 127 are connected to the outside terminals of secondary 109, thereby being energized in push-pull fashion. Anodes 133, 135 are energized cophasally from a sources 137 of alternating current, which also supplies the pick-off unit 101, by way of conductor 139, output resistors 141, 143, and tuned chokes 145, 147, tuned to the frequency of the source 137. The other terminal of source 137 is connected by wire 149 to center tap 115 of secondary winding 109. Grids 129, 131, which act as screen grids in the present illustration, are energized from sources 137 by way of a voltage dropping resistor 151. Bypass condenser 153, 155, 157, 159 are also used.

In the absence of input voltage to grids 125, 127, the circuits of both sections of tube 121 are balanced, so that equal (and opposite) voltages will appear across output resistors 141, 143.

In operation, the output of pickoff device 101 will be an alternating voltage having the same or opposite phase with respect to that of source 137. Phase adjuster 106, which may be a variable condenser, is adjusted to assure this proper phase relation. This phase adjuster may be inserted in lines 21, if desired. The output voltage is fed in push-pull to the control grids 125, 127 by way of transformer 105. Hence, one of the two grids 125, 127 will have an impressed voltage thereon of the same phase as its corresponding anode, and the other will have opposite phase, it being noted that both anodes 133, 135 are energized in like phase from source 137. Which particular grid 125 or 127 has this same phase as its corresponding anode will depend on the phase of the output voltage from pickoff device 101, and will, therefore, depend on the sense of the relative motion between the armature 161 and field 163 of the pickoff device 101. For purposes of illustration, let it be assumed that grid 125 has a voltage impressed on it in phase with its anode 133. Then, during the half-cycles of supply source 137 when anode 133 is positive with respect to cathode 117, the upper section of tube 131 will be more conductive than with zero voltage applied to grid 125, and an increased output voltage will appear across output resistor 141. During the other half-cycles, the conduction of this section of tube 121 will be blocked by its anode voltage, which is then negative with respect to cathode 117. The upper section of tube 121, therefore, acts as a half-wave rectifier. Tuned choke 145 and bypass condensers 153, 155 prevent the alternating component of the output voltage of tube 121 from appearing across output resistor 141.

At the same time, in the illustrative example used, grid 127 will have a negative voltage applied to it during the positive anode half-cycle, so that the current in, and the voltage drop across, resistor 143 will decrease from the value with zero voltage on grid 127. The net change in direct voltage across resistors 141 and 143 corresponds in magnitude to the magnitude of the alternating voltage output from pickoff device 101, and in sense to the phase of that voltage, and thereby to the relative deviation of the pickoff armature. Tube 121, therefore, acts as a phase sensitive amplifier and half-wave rectifier for the signal voltage from the pickoff device 101.

Connected across output resistor 141 is a differentiating circuit comprising condenser 165 and variable resistance 167. A similar differentiating circuit 169, 171 is connected across the other output resistor 143.

Since condenser 165 (or 169) will pass current only if the voltage applied from resistor 141 (or 143) is varying, it will be evident that this current corresponds to a rate of change, or time derivative, of the voltage output of tube 121, and therefore, of the voltage output of pickoff 101. This "rate" current, flowing through resistor 167 (or 171) will produce a "rate" voltage, adjustable in magnitude by adjusting the resistance value of resistor 167 (or 171). This "rate" voltage is applied to a similar differentiating circuit 173, 175 to produce a voltage across resistor 175 corresponding to "acceleration"; that is, the time derivative or rate of change of the "rate" voltage. In order that the voltage across resistor 175 may have a "velocity" component in addition to its "acceleration" voltage, variable resistor 179 is shunted across condenser 173, thereby permitting an adjustable component of "rate" current to flow through resistor 175. A similiar circuit 181, 183, 185 is placed in the lower section of the push-pull circuit. Adjusting resistor 167 (or 171) will adjust the amount of "rate" voltage produced, and will, therefore, also adjust the "acceleration" voltage produced, since the second differentiating circuit 173, 175 (or 181, 183) depends for its input on the voltage across resistor 167 (or 171). Adjusting resistor 179 (or 185) adjusts the relative amounts of "rate" and "acceleration" components produced across resistor 175. This may be readily seen from the fact that with zero value for resistance 179, no differentiation is possible, and the output is "velocity" only. With infinite resistance value for 179, no "velocity" component is transmitted, and the output is pure "acceleration." Intermediate value of resistance, of course, provide varying relative amounts of "rate" and "acceleration" components.

In each of these differentiating circuits, the resistance (167, 175, 171, 183) is made small in value compared to the reactance of its corresponding capacitance (165, 173, 169, 181) at the low frequencies corresponding to the rates of variation of signal voltage magnitude, in order to provide effective differentiation. Also, the total impedance of the second differentiating circuits (173, 175 and 181, 183) is made high compared to that of resistance 167 or 171, in order to prevent undue loading of the first differentiating circuits (165, 167 and 169, 171).

In the same manner as the second derivative or "acceleration" voltage is obtained, third, fourth or higher derivatives, as desired, may also be obtained.

The combined "rate" and "acceleration" voltage appearing across the resistance 175 (183) is connected in series with a voltage representing the original signal or "displacement" voltage itself, obtained from secondary winding 111 (or 113) by means of magnitude adjusting potentiometer 187 (or 189). Winding 111, in the illustrative example used, is connected so as to increase the current to anode 201, while winding 113 is connected oppositely. The combined "displacement," "rate," and "acceleration" voltage is applied between cathode 191 (or 193) and control grid 195 (or 197) of tube 177, in series with cathode biasing resistor 199. Anodes 201, 203 of tube 177 are energized through their respective load resistors 205, 207 from source 137. It will be noted that one terminal of source 137 is already connected, by wire 139 and resistor 199 to cathodes 191, 193. Hence, wire 209 leading to anodes 201, 203 is connected to the other side of supply source 137. Grids 211, 213 act as screen grids and are connected to wire 209 by voltage dropping resistor 215.

Anode 201 is connected directly to control grid 219 of duplex tube 223, and similarly anode 203 is connected directly to grid 221. Anodes 201 and 203 are connected together by condenser 217. The common terminal 225 is connected to cathodes 227, 229 by cathode biasing resistor 231.

The anodes 233, 235 are energized from source 137 through their respective matched loads 237, 239 which form two similar and opposed field windings for direct current generator 241. These windings are bypassed by bypass condensers 243, 245. Since cathodes 227, 229 are directly connected to wire 209, anodes 233, 235 must be connected to the other terminal of source 137, as by conductor 139.

The field windings 237, 239 form highly inductive loads, which, when working out of low resistance driving sources, such as power amplifier tubes or gas-filled tubes, would have high time constants, preventing close following of the controlled motor. However, in the present system the generator fields are matched to the plate resistances of their respective amplifier tubes, and the combination is one inherently having a small time constant, permitting accurate control.

Tube 177 serves as a D.-C. amplifier for the combined "displacement," "rate" and "acceleration" voltage connected to its control grids. Since this tube is energized by alternating current from source 137, it will conduct only during half cycles in which conductor 209 is positive with respect to cathodes 191, 193. Hence, voltage will appear across its output resistor 205 (or 207) only during these half-cycles. The circuits of both sections of tube 177 are also balanced, so that, with zero signal on both grids 195, 197, equal current will flow in, and equal voltage drops will appear across, output resistors 205, 207. Cathode biasing resistor 199 is selected in resistance value to provide operation about the center of the linear portion of the grid characteristic of each section of the tube 177.

It will be seen that, during those half cycles when tube 177 conducts, the total voltage drop across resistor 205 (or 207) will bias grid 219 (or 221). However, this will not affect that output of tube 223, since during those same half-cycles, anodes 233, 235 are negative and tube 223 does not conduct. During the other half cycles, no grid voltage would appear on grids 219, 221, as tube 177 is then non-conductive. To avoid this difficulty, condenser 217 is connected across grids 219 and 221, being also across output resistors 205, 207. With zero input to tube 177, condenser 217 is uncharged, since the stand-by or zero input, voltage across resistor 205 balances and cancels that across resistor 207, leaving zero net voltage across condenser 217. When input voltage is applied to the grids 195, 197 of tube 177, the voltages across resistors 205, 207 will change, and in opposite directions, during half-cycles when anodes 201, 203 are positive. In the illustrative example used, the voltage across resistor 205 will increase, and that across 207 will decrease. The net change in voltage will charge condenser 217, so that, during the succeeding half-cycles, when tube 177 is non-conductive, this net voltage will persist and be maintained on grids 219, 221, and will control tube 223, since anodes 233, 235 are then positive. In this manner, the stand-by voltages across resistors 205, 207 have no effect on grids 219, 221, only the changes in these voltages being used in the succeeding stage. This arrangement provides a very successful direct-coupled direct-current amplifier directly energized from a single source of alternating current, since the standby voltages have no effect on the succeeding stage.

Condenser 217 may be made adjustable, and should be adjusted to give maximum output.

It is clear that the number of D.-C. amplifier stages may be extended as much as desired, merely assuring that each stage is energized from the A.-C. source in a phase relation opposite to that of the previous stage, and that some means, such as condenser 217, is used to enable "holdover" of the useful portion of the output voltage from the preceding stage, and to prevent the adverse biasing effect of the standby voltage drops.

The output currents of tube 223 are smoothed by condensers 243 and 245 and energized field windings 237 and 239 of generator 241, which form the load on, and are matched in impedance to, the sections of tube 223. Windings 237 and 239 are identical, and the sections of tube 223 are balanced so that equal currents will flow in windings 237, 239 with zero input to tube 223. Tube 223 is also operated at the center of the linear portion of the grid characteristic. Under these conditions the effects of the two windings 237, 239 cancel one another. When input voltage is applied to the grids 219, 221 of tube 223, in the manner described above, the current through one winding 237 or 239 will increase and that through the other will decrease, producing a net magnetic field whose magnitude and polarity correspond to the magnitude and polarity of the signal. Generator armature 241 is driven at constant speed by any suitable means, such as motor 242, and will generate a voltage also corresponding to the combined signal. This generator output voltage is fed to the armature of direct current motor 247, whose field 249 has fixed excitation from a suitable direct current source.

The armature resistance of motor 247 is matched to that of the generator 241, including the effect of armature reaction, so as to provide maximum power transfer therebetween. Hence, motor 247 will turn at a speed corresponding to the combined voltage and in a direction corresponding to the signal voltage phase. Motor 247 may be directly coupled, as by pulley arrangement 248, to any type of load, such as rudder 251, or follow-up device 2.

Tubes 121, 177 and 223 have been illustrated as being of the duplex or twin type of tube. It is obvious that two separate tubes could be used in place of each of these twin tubes. Also, these tubes need not be tetrodes or triodes, as shown. It is immaterial whether they be triodes, tetrodes, pentodes or other types of tubes, so long as they operate as linear amplifier tubes. Also, they may be of the vacuum or grid-controlled gas-filled type.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In a rate circuit comprising a source of first signal votage, a first differentiating means for producing a second signal voltage corresponding to a time derivative of said first signal voltage, said differentiating means including an adjustable resistance element connected to provide said second signal voltage thereacross, a second differentiating means connected with said resistance element for producing from second signal voltage a third signal voltage corresponding to a time derivative of said second signal voltage, said second differentiating means including an element having resistance across which said third signal voltage is produced, and variable resistance means for supplying a component of said second signal voltage to said last mentioned element.

2. In a rate circuit comprising a source of first signal voltage, means for producing a second signal corresponding to a time derivative of said first signal, said means including a first variable resistor across which said second signal is produced, and a network comprising parallel connected capacitance and a second variable resistor and an element having resistance connected in series with said parallel capacitance and resistor, said network being connected across said first variable resistor and said capacitance and said element having such capacitative and resistive values respectively as to function as a differentiating circuit, whereby to provide a signal output including said second signal and a third signal corresponding to a time derivative of said second signal.

3. A rate circuit having an input and an output, a source of first signal voltage connected across said input, a first differentiating means for producing a second signal corresponding to a time derivative of said first signal, a second differentiating means for producing from said second signal a third signal corresponding to a time derivative thereof, said second differentiating means including an element having resistance connected to said output, said first differentiating means including an adjustable impedance means connected to provide said second signal voltage thereacross whereby to control the maximum value of said second and third signals for a given value of said first signal, and adjustable coupling means connecting said adjustable impedance with said output whereby to supply a component of said second signal to said output and to control the values of each of said second and third signals; whereby the magnitudes of said time derivative signals may be simultaneously adjusted to a limiting value and the relative values thereof as so limited may be simultaneously adjusted.

4. A rate circuit comprising a source of first signal voltage, a first differentiating means for producing a second signal corresponding to a time derivative of said first signal, a second differentiating means for producing from said second signal a third signal corresponding to a time derivative thereof, said second differentiating means including a resistance element across which said third signal is produced, said first differentiating means including an adjustable impedance means connected to provide said second signal voltage thereacross whereby to control the maximum value of said second and third signals for a given value of said first signal, adjustable coupling means connecting said adjustable impedance with said resistance element of the second differentiating means to control the values of each of said second and third signals and for supplying a component of said second signal to said resistance element; whereby the magnitudes of said time derivative signals may be simultaneously adjusted to a limiting value and the relative values thereof as so limited may be simultaneously adjusted, and means for combining with said second and third signals a component of said first signal.

5. A rate circuit comprising a source of first signal voltage, means for producing therefrom a second signal corresponding to a time derivative of said first signal and including a variable resistor across which said second signal is produced, a resistance-capacitance network connected across said variable resistor for producing from said second signal a third signal corresponding to a time derivative thereof, and variable resistance means connected with said variable resistor and in shunt with said capacitance, said last-mentioned means serving to supply a component of said second signal to the output of said network and being so constructed and arranged as to differentially regulate the relative magnitudes of said derivative signals in the resultant signal.

6. In a rate circuit comprising an output and input adapted to receive a first signal voltage, a first differentiating means for producing a second signal corresponding to a time derivative of said first signal and including an adjustable resistance element across which said second signal is produced, a second differentiating means connected with said resistance element and with said output for producing a third signal corresponding to a time derivative of said second signal in said output, and variable impedance means connecting said adjustable resistance element with said output for supplying a component of said second signal to said output; said variable impedance means being adjustable simultaneously to regulate the values of each of said second and third signals and thereby to control the ratio thereof.

PERCY HALPERT.
CARL A. FRISCHE.
JOHN L. BIRD.
ORLAND E. ESVAL.

REFERENCES CITED

The following references are of record in the file of this patent:

UNITED STATES PATENTS

| Number | Name | Date |
|---|---|---|
| 895,914 | Troy | Aug. 11, 1908 |
| 1,315,539 | Carson | Sept. 9, 1919 |
| 1,483,172 | Gannett | Feb. 12, 1924 |
| 1,909,153 | Smiley | May 16, 1933 |
| 1,960,689 | Asch | May 29, 1934 |
| 1,988,458 | Minorsky | Jan. 22, 1935 |
| 2,068,490 | Hull | Jan. 19, 1937 |
| 2,084,186 | Braden | June 15, 1937 |
| 2,088,654 | Hull | Aug. 3, 1937 |
| 2,146,091 | Peterson | Feb. 7, 1939 |
| 2,207,976 | Ferrell | July 16, 1940 |
| 2,233,415 | Hull | Mar. 4, 1941 |
| 2,252,053 | Watson | Aug. 12, 1941 |
| 2,258,752 | Fewings | Oct. 14, 1941 |
| 2,304,740 | Minton | Dec. 8, 1942 |